United States Patent
Heinonen et al.

(10) Patent No.: US 10,601,734 B2
(45) Date of Patent: Mar. 24, 2020

(54) METHOD OF OPERATING A NETWORK ENTITY

(71) Applicant: NOKIA SOLUTIONS AND NETWORKS OY, Espoo (FI)

(72) Inventors: Johanna Heinonen, Espoo (FI); Hannu Flinck, Helsinki (FI); Tapio Sakari Partti, Espoo (FI); Jarmo Tapio Hillo, Kirkkonummi (FI)

(73) Assignee: NOKIA SOLUTIONS AND NETWORKS OY, Espoo (FI)

(*) Notice: Subject to any disclaimer, the term of this patent is extended or adjusted under 35 U.S.C. 154(b) by 150 days.

(21) Appl. No.: 15/323,746

(22) PCT Filed: Jul. 8, 2014

(86) PCT No.: PCT/EP2014/064543
§ 371 (c)(1),
(2) Date: Jan. 4, 2017

(87) PCT Pub. No.: WO2016/004980
PCT Pub. Date: Jan. 14, 2016

(65) Prior Publication Data
US 2017/0142032 A1    May 18, 2017

(51) Int. Cl.
| | |
|---|---|
| H04L 12/931 | (2013.01) |
| H04L 12/46 | (2006.01) |
| H04L 12/66 | (2006.01) |
| H04L 12/713 | (2013.01) |
| H04L 12/947 | (2013.01) |

(52) U.S. Cl.
CPC .......... *H04L 49/70* (2013.01); *H04L 12/4633* (2013.01); *H04L 12/66* (2013.01); *H04L 45/586* (2013.01); *H04L 49/25* (2013.01)

(58) Field of Classification Search
None
See application file for complete search history.

(56) References Cited

U.S. PATENT DOCUMENTS

| | | | | |
|---|---|---|---|---|
| 8,072,901 | B1 * | 12/2011 | Blair | H04L 45/00 370/254 |
| 9,252,972 | B1 * | 2/2016 | Dukes | H04L 49/70 |
| 9,258,742 | B1 * | 2/2016 | Pianigiani | H04L 67/327 |
| 9,356,866 | B1 * | 5/2016 | Sivaramakrishnan | H04L 45/7453 |
| 9,641,435 | B1 * | 5/2017 | Sivaramakrishnan | H04L 45/745 |
| 2009/0323635 | A1 * | 12/2009 | Gras | H04W 36/0011 370/331 |
| 2010/0208653 | A1 | 8/2010 | Morinaga et al. | |

(Continued)

OTHER PUBLICATIONS

International Search Report and Written Opinion dated Sep. 5, 2014 corresponding to International Patent Application No. PCT/EP2014/064543.

(Continued)

*Primary Examiner* — Chi H Pham
*Assistant Examiner* — Vladislav Y Agureyev
(74) *Attorney, Agent, or Firm* — Squire Patton Boggs (US) LLP (57) ABSTRACT

Method of operating a network entity A method of operating a network entity of a network comprising a gateway (200) is provided, wherein the method comprises dynamically changing a packet processing resource (204, 227) in the gateway (200).

16 Claims, 4 Drawing Sheets

(56) References Cited

U.S. PATENT DOCUMENTS

| | | | | |
|---|---|---|---|---|
| 2010/0238946 A1* | 9/2010 | Lu | H04L | 47/2441 |
| | | | | 370/412 |
| 2012/0303835 A1* | 11/2012 | Kempf | H04W | 24/02 |
| | | | | 709/235 |
| 2013/0052995 A1* | 2/2013 | Shi | H04L | 12/6418 |
| | | | | 455/411 |
| 2013/0121207 A1 | 5/2013 | Parker | | |
| 2014/0226661 A1* | 8/2014 | Mekkattuparamban | | |
| | | | H04L | 45/74 |
| | | | | 370/392 |
| 2015/0280939 A1* | 10/2015 | Sindhu | H04L | 12/4641 |
| | | | | 370/236 |
| 2016/0205071 A1* | 7/2016 | Cooper | H04L | 12/6418 |
| | | | | 726/1 |
| 2017/0033992 A1* | 2/2017 | Dichtel | H04L | 12/4633 |

OTHER PUBLICATIONS

Ericsson, "Switching the UL Tunnel Endpoint at X2 Handover," 3GPP Draft; R3-072411, 3rd Generation Partnership Project (3GPP), 3GPP TSG-RAN WG3 #58, Dec. 18, 2007, XP050262543.

Cisco Systems et al., "Fill the spec gap for the lack of certain X2 H0 scenarios involving HeNB/HeNB-GW," 3GPP Draft; R3-140031 CR S1AP HENB X2 H0 Spec Gap, 3GPP TSG-WG3 Meeting #83, Prague, Czech Republic, Feb. 9, 2014, XP050738476.

European Office Action for corresponding Appln. No. 14 739 102.3, dated Jan. 31, 2019.

* cited by examiner

METHOD OF OPERATING A NETWORK ENTITY

FIELD OF INVENTION

The present invention relates to a method of operating a network entity or network element, e.g. of a communication network or computing network, in particular a method of GTP or IPsec termination in a network. Furthermore, it relates to a network entity, e.g. a gateway in a network, in particular a virtualized gateway. Moreover, it relates to a network, e.g. a communication network or computing network, a program element and a computer-readable medium.

ART BACKGROUND

Virtualization and software defined networking (SDN) technologies are currently changing the principles and used practices in computing and networking areas. Cost reduction in computing and storage areas has been achieved by means of server virtualization in multitenant virtualized data centers. Server virtualization decouples operating system from underlying hardware and offers each tenant a pool of isolated virtualized resources that can be provisioned on-demand and workload can be balanced within and across data centers.

Network Functions Virtualization (NFV))—an operator-led ETSI ISG—aims to use standard IT virtualization technology to implement network functions in software and utilize standard high volume servers, switches and storage located in datacenters and network nodes.

In the networking area, SDN is an approach that allows dynamic network configuration in real-time. Open Flow protocol that is developed by Open Network Foundation (ONF) is an example of dynamic programming between logically centralized controller and packet forwarding switch.

When applying virtualization and SDN principles to evolved packet core (EPC) packet gateways (S/P-GW), control functionalities are virtualized and implemented in the cloud. Fast path packet processing and GTP termination is separated from the control functions by using OpenFlow protocol. GTP termination can be implemented either in the fast path (possibly located in a distant site) with dedicated hardware or in the general purpose hardware in the cloud.

Typically, in virtualized gateways, where user plane handling is separated from control plane functionalities, all 3GPP signaling interfaces are terminated to the S/P-GW control element. During an attach procedure, "Create session request" message from S1 interface triggers a creation of GTP encapsulation and decapsulation flows to the selected user plane switch. In order to do this, S/P-GW control element communicates with OpenFlow controller via Northbound API. OpenFlow controller together with OpenFlow protocol may be the enabler of the communication between control plane and user plane.

One problem is that flow entries that implement GTP encapsulation/decapsulation are user specific (each UE has GTP TEID and IP address of its own) and it is not possible to aggregate them. This means that the user plane switch has to hold state for each active UE. However, the size of flow tables in the switches is limited. One solution is to terminate all sessions with low bandwidth and non-real time traffic (e.g. M2M contexts) to the cloud and keep only sessions that have real time, high bandwidth traffic in the fast path.

SUMMARY

However, there may be a need to provide a more flexible method of operating a network.

This need may be met by a method of operating a network entity, a network entity for a network, a network, a computer readable medium and a program element, according to the independent claims. Further embodiments are described by the dependent claims.

According to an exemplary aspect a method of operating a network entity of a network comprising a gateway is provided, wherein the method comprises dynamically changing a packet processing resource in the gateway. In particular, the packet processing resource may be a GTP termination point or an IPsec termination point.

According to a further exemplary aspect a method of operating a network entity of a network comprising a gateway is provided, wherein the method comprises dynamically changing a GTP termination point (or mobility anchor point) in the gateway (GTP=GPRS tunnelling Protocol).

In particular, the gateway may be a serving gateway (S-GW) and/or a packet data network gateway (P-GW). GTP or GPRS Tunneling Protocol refers to a group of IP-based communication protocols used to carry general packet radio service (GRPS) within GSM, UMTS and LTE networks. IPsec (Internet Protocol Security) refers to a protocol suite for securing Internet Protocol (IP) communications by authenticating and encrypting each IP packet of a communication session.

According to an exemplary aspect a network entity for a network is provided, wherein the network entity is adapted to perform a method according to an exemplary aspect.

In particular, the network entity may comprise a (virtual) controller, a (virtual) processing unit, or (virtual) computing unit adapted to perform the method according to a method according to an exemplary aspect.

According to an exemplary aspect a network is provided comprising at least two network entities according an exemplary aspect which are connected to each other by a communication link.

In particular, the communication link may be a communication line, a radio link or the Internet.

According to another exemplary aspect a program element is provided, which, when being executed by a processor, is adapted to control or carry out a method according to an exemplary aspect.

According to another exemplary aspect a computer-readable medium is provided, in which a computer program is stored which, when being executed by a processor, is adapted to control or carry out a method according to an exemplary aspect.

The term "network entity" may particular denote any entity, device, unit or element of a network, either virtual or physical which forms part of a network. Examples of a network entity may be a gateway, a fast path node, a cloud or cloud computing network, computing unit, base station or the like.

The term "gateway" may particularly denote a network entity or network node of a first network which is adapted to interface with another network which is different to the first one. For example, the first network and the another network may use different protocols.

The term "packet processing resource" may particularly denote any resource in a (packet oriented) network involved in the processing of load (e.g. packets) in the network. This term has to be interpreted in a broad sense and may in particular include termination points like GTP and IPsec termination points.

By providing a method enabling a dynamic switching or changing of a packet processing resource, e.g. a GTP termination point or IPsec termination point, it may be possible to provide a more flexible operation network, e.g. a communication or computer network. Furthermore, it may be possible to separate user plane handling from S/P-GW control functionalities, so that the user plane and control plane are scaling independently. Thus, it may be possible that the GTP termination point (user plane element) can be selected optimally for each UE. There may also be cases where dynamic switching of GTP termination point and/or IPsec termination point of an active session is useful—this enables the movement of mobility anchor between cloud and fast path.

Summarizing a gist of an exemplary aspect may be to provide a method of operating a network entity wherein a packet processing resource, e.g. GTP termination point or IPsec termination point, may be dynamically changed or shifted, thus potentially improving the flexibility of the network entity and thus of the whole network and communication or data transfer in the network. In particular, it may be possible to dynamically optimize a location of a termination point or mobility anchor point even during an ongoing session.

In the following further embodiments of the method of operating a network entity of a network will be described. However, the described components and features may also be used in connection with the network entity, the network, the program element and the computer-readable medium.

According to an exemplary embodiment of the method the gateway is a virtualized gateway.

According to an exemplary embodiment of the method the gateway further comprises a fast path node including a fast path switch, wherein the user data packets arriving at the gateway via the fast path switch.

In particular, all user data packets may arrive at the gateway via the fast path switch.

The term "fast path" may particularly denote a path with a shorter instruction length through a program, algorithm or routine compared to the "normal path" therefore handling commonly occurring tasks more efficiently than the "normal path". For example, dedicated packet routing hardware used to build computer or communication networks will often include hardware dedicated to handle the most common kinds of packets, with other kinds, for example with control information or packets directed at the device itself instead of to be routed elsewhere, put on the "normal path", in this example usually implemented by software running on the control processor.

According to an exemplary embodiment of the method the gateway further comprises a cloud comprising a virtual switch connected to the fast path switch.

According to an exemplary embodiment of the method the virtual switch of the cloud and the fast path switch operate on the same communication protocol.

In particular, the communication protocol may be the OpenFlow protocol. Thus, the virtual switch and the fast path switch may be under control of the same communication protocol, e.g. OpenFlow, or may operate under the same protocol. The use of the same communication protocol may ease the possibility to change the GTP and/or IPsec termination point dynamically even during ongoing sessions.

According to an exemplary embodiment of the method the GTP or IPsec termination point is a default GTP termination point or IPsec termination point, respectively.

In particular, the default value or the default (GTP) termination point may be determined based on an Access Point Name (APN), where respective user equipment (UE) specific GTP encapsulation/decapsulation flows are initially created. For example, the default (GTP) termination point may be located or implemented at the fast path side or on the cloud side of a fast path.

According to an exemplary embodiment of the method the fast path switch acts as a router or a forwarder.

In particular, the fast path may act as a router with the help of a cloud resident control plane that may contain a routing process. For example, the fast path switch may act as a router on behalf of user plane virtual machines (VMs) forming GTP termination points and located or implemented in the cloud. For this purpose a flow entry, that forwards all GTP packets arriving from an S1 interface and destined to a user plane VM, may be created to the fast path. Another flow entry may be created for a mobile IP address pool associated to the cloud APN.

According to an exemplary embodiment the method further comprises generating flow entries to a fast path connecting the cloud and the fast path node, wherein the generating is performed at a high priority.

In particular, the flow entries may be user specific GTP encapsulation/decapsulation flow entries. For example, the flow entries may be generated when a session associated with the GTP termination point is moved from the fast path to the cloud. The term "high priority" may particular denote that the priority is higher than a priority used for generating or creating flow entries to the fast path from user packets.

According to an exemplary embodiment the method further comprises moving a session from one processing point to another one.

According to an exemplary embodiment the method further comprises moving a session from the fast path to the cloud.

In particular, the session may be moved from the fast path or fast path node to a virtual machine of the cloud, e.g. to a user plane VM having free capacity. Such a user plane VM may be selected or determined out of a group of VMs already running in the cloud or may be started newly. Furthermore, UE specific GTP encapsulation/decapsulation flow entries may be generated to the selected user plane VM and/or removed from the fast path.

According to an exemplary embodiment the method further comprises selected packet flow forwarding to the cloud.

According to an exemplary embodiment the method further comprises forwarding GTP packets to the cloud.

In particular, GTP packets that do not match in any UE specific GTP termination flows in the fast path may be forwarded to the cloud. Furthermore, GTP packets which do not have UE specific GTP termination flows in the cloud as well may be dropped.

According to an exemplary embodiment of the method the changing of the packet processing resource is initiated by a trigger.

According to an exemplary embodiment of the method the changing of the GTP termination point is initiated by a trigger.

In particular, the trigger or triggering event may be a manual trigger, e.g. a manual generation of a signal, or may be an automatic trigger, e.g. a trigger signal may be generated in the event of the exceeding or undershooting of a threshold. For example, the triggering event may be the determination of the event that a traffic volume threshold is exceeded. In particular, the dynamic switching of the packet processing resource, e.g. GTP termination point, may be initiated when an OpenFlow controller, e.g. implemented in the cloud, receives a trigger.

According to an exemplary embodiment the method further comprises exchanging a message including at least one field, wherein a value of the field is indicative of at least one value selected out of the group consisting of value indicative of an ability of a GTP termination point to be changed, and a value identifying the GTP termination point to be changed.

In particular, the network may comprise a Gx interface. For example, the at least one field may represent new information elements. The field(s) may be introduced in PCC (policy and charging control) rule information which may be specified in 3GPP, for example. The value indicative of the ability of the termination point to be changed may be either enabled or disabled, i.e. may represent two states. The value identifying the GTP termination point to be changed may represent or may be indicative for the node or point, e.g. fast path or cloud, to which the GTP termination point is switched or is to be switched. It should be noted that it may be possible that wildcards are used or are present in the fields or the values may represent wildcards, so that for example the decision with respect to the actual destination point or node the GTP termination point is switched is left to the controller. However, the restriction may be present or imposed to the controller that the currently cloud termination GTP session will be moved to the fast path and vice versa, i.e. that a witch or change of the GTP termination point should take place.

According to an exemplary embodiment the method further comprises exchanging a message including at least one field, wherein a value of the field is indicative of at least one value selected out of the group consisting of value indicative of an ability of packet processing resource to be changed, and a value identifying the packet processing resource to be changed.

According to an exemplary embodiment of the method the at least one field is implemented in policy and charging control rules and/or application detection and control rules.

According to an exemplary embodiment of the method further comprises receiving the policy and charging control rules and/or the application detection and control rules at a software defined networking controller.

In particular, the policy and charging control (PCC) rules and/or the application detection and control (ADC) rules are transmitted by the gateway, e.g. an S/P-Gateway, to the SDN controller, e.g. via north bound API. In particular, the SDN controller may program relevant flow entries to the switch which is the GTP termination point for a specific user or subscriber. The SDN controller may be an Open Flow controller, which may be informed by a JSONRPC messaging, for example. It should be noted that for implementing the policy and charging control rules a selected user plane element (packet processing resource, e.g. GTP termination point or IPsec termination point) preferably implements packets and/or volume counters that monitor packet flow according to the mentioned rules. Thus, an efficient way to for support volume based triggering may be provided.

According to an exemplary embodiment of the method the policy and charging control rules and/or application detection and control rules are transmitted to a gateway via policy and charging rules function.

In particular, the gateway may be informed or instructed during an attach procedure of a user or a user equipment which applications to detect by activating appropriate subscriber specific ADC/PCC rules. For example, the attach procedure may be indicated by a start/stop of a respective application, which may be detected, e.g. by an S/P gateway.

According to an exemplary embodiment of the method the trigger is generated based on a detection of transmitted packet matches a user equipment specific rule defined in policy and charging control rules and/or application detection and control rules.

For example, the trigger may be sent to a controller, e.g. an SDN controller. In particular, the detection of the matching may be performed based on a flow table containing the user specific rules, which may be defined for each application to be detected independently from each other, for example. Furthermore, the detection may be performed by a meter which may be included in each flow.

Summarizing an exemplary specific embodiment may be based on the idea of providing a method or mechanism enabling a dynamical changing of a packet processing resource, like a GTP termination point or mobility anchor point, in a network entity or element, like a gateway, even during a session. In particular, exemplary embodiments introduce a mechanism how to dynamically switch the GTP termination point (mobility anchor) between the fast path and cloud. Since it can be assumed that GTP termination in the cloud causes more latency than termination in the fast path, there may be cases where it is advantageous to dynamically switch the GTP termination point of an existing session from cloud to the fast path (e.g. M2M case where motion detection starts video streaming). By providing a possibility to move dynamically a set of sessions to the cloud it may be possible to avoid overloading the fast path. In particular, the dynamic change or moving of the GTP termination point may avoid the necessity to recreate sessions when the GTP termination point or mobility anchor point shall be moved, e.g. in order to improve latency. The dynamic switching of GTP termination point between cloud and fast path may be a tool to decide the optimal GTP termination point for each user in real time. It may also make it possible to utilize cheap general purpose HW in the cloud as much as possible and keep minimum amount of state in the dedicated HW in the fast path.

According to a specific embodiment a new policy control action and related mechanisms to enforce dynamic switching of a session between cloud and fast path as a result of application detection may be provided. In particular, it may be possible to take into consideration subscriber profiles. It may offer capability to dynamically add/remove subscriber specific rules. Application detection and control functionality may be able to detect when a certain application is started/stopped which could be the trigger for the dynamic termination point switching procedure. The dynamic switching of GTP termination point between cloud and fast path is a tool to decide the optimal GTP termination point for each user in real time. In general this exemplary aspect may offer a general, subscriber specific and dynamic solution to trigger GTP termination point switching as part of standardized PCRF machinery.

The aspects and exemplary embodiments defined above and further aspects of the invention are apparent from the examples of embodiment to be described hereinafter and are explained with reference to these examples of embodiment.

DETAILED DESCRIPTION

The illustrations in the drawings are schematic. In the following a detailed description of exemplary embodiments is given. In the beginning in the context of FIG. 1 some general remarks concerning a method or mechanism operating a network in particular a virtualized network are given.

While the following embodiments are described in the context of a changing of a GTP termination point it should be appreciated by persons killed in the art that the same principles apply for every packet processing resource, like an IPsec termination point as well.

Figure 1:
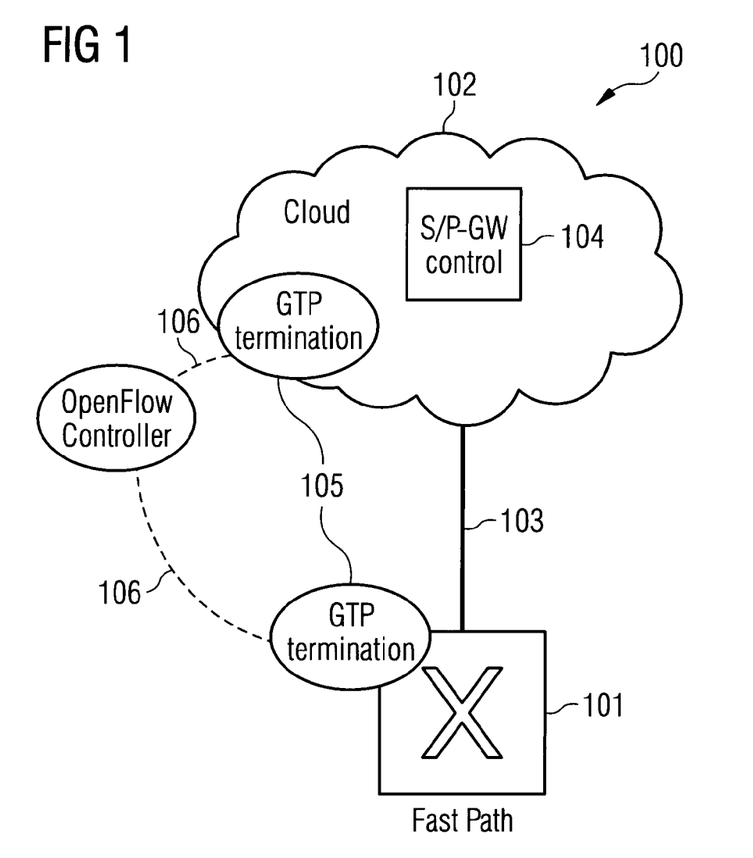
FIG. 1 schematically shows a virtualized Evolved Packet Core packet gateway.

FIG. 1 schematically shows a virtualized Evolved Packet Core (EPC) packet gateway 100. The EPC packet gateway 100 comprises a fast path node 101 which is typically implemented or formed by dedicated hardware. The fast path node 101 is connected to a cloud 102, typically formed by general purpose hardware, by a fast path 103. In particular, a serving gateway and/or packet data network gateway (P-GW) controller (schematically indicated by 104) is implemented in the cloud serving as a controller for the gateway. In principle, a GTP termination point 105 can be either implemented at the cloud side or at the fast path node side of the gateway as schematically depicted in FIG. 1. Open Flow is used to interlink separated control plane and user plane, which is schematically indicated in FIG. 1 by the dotted line 106.

In context of FIG. 2 an exemplary embodiment of a method or mechanism of a dynamic GTP termination in a gateway will be described. It should be noted that this is a specific embodiment described and tailored for a cloud setup using OpenStack. In case other software is used for the cloud setup, details of the implementation may be different but can also be similar or identical.

Figure 2:
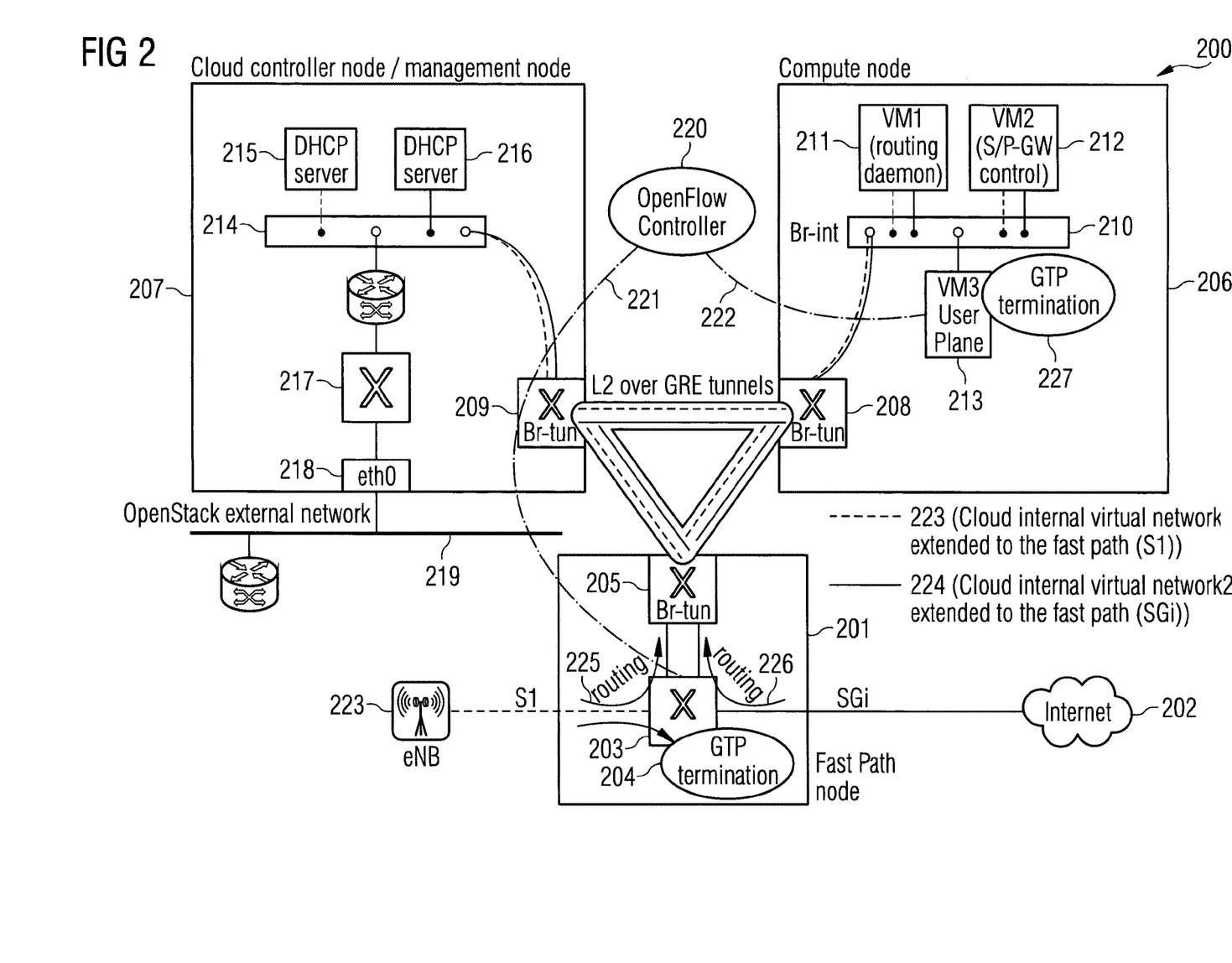
FIG. 2 schematically shows a dynamic GTP termination in gateway according to an exemplary embodiment.

In particular, FIG. 2 shows a gateway 200. The gateway 200 comprises a fast path node or fast path element 201 connected to the Internet 202 via a user plane interface SGi and to an enhanced NodeB 223 via a user plane interface S1. Furthermore, a first or fast path switch 203 is implemented in the fast path node 201 implementing some routing function. In addition the first switch may function as one possible GTP termination point 204 as indicated in FIG. 2. The fast path switch 203 is connected to a first tunneling-bridge (Br-tun) switch 205 functioning as an interface to a fast path connected to a compute node 206 and a cloud controller node/management node 207 comprising a second Br-tun switch 208 and a third Br-tun switch 209, respectively. It should be noted that the first, second and third Br-tun switches may be implemented as virtual switches.

The second Br-tun switch 208 of the compute node 206 is connected to an integration bridge Br-Int 210 connecting to virtual machines 211, 212 and 213 each may be configured for different functions or applications, e.g. forming a routing daemon, an S/P GW control or a user plane, which may form another dynamic GTP termination point 227. It should be noted that the cloud may of course comprise more than one compute node.

The third Br-tun switch 209 of the cloud controller node 207 is connected to another bridge 214 connected to DHCP servers 215 and 216 and in addition via a further switch 217 to an Ethernet interface 218 connected to an OpenStack external network 219.

In addition the gateway 200 comprises an OpenFlow controller schematically indicated in FIG. 2 by the ellipse 220 and used to dynamically changing or shifting the GTP termination point. The control is schematically indicated by the dashed lines 221 and 222 leading from the OpenFlow controller 220 to the first switch 203 and to the third virtual machine 213, respectively. In addition, FIG. 2 schematically indicates two different networks wherein a first cloud internal virtual network extending to the fast path (S1) is indicated by the dashed lines 223 while a second cloud internal virtual network extends to the fast path (SGi) is indicated by the solid lines 224.

In the virtualized S/P-GW virtual networks of the cloud (L2 segments) span out to the fast path element 201. This is achieved by means of connecting fast path element 201 to the same network, e.g. a L2 over GRE tunnel mesh network, as all the compute nodes 206 in the cloud.

The physical 3GPP user plane interfaces S1 and SGi are located in the fast path element 201. Therefore the entry point for all user data packets arriving to gateway 200 is via the fast path switch 203. This together with the fact that both the fast path switch 203 as well as the virtual switches 205, 208 and 209 in the cloud are under OpenFlow control makes it possible to change the GTP termination point dynamically for ongoing sessions.

This can be done in the following way:

1. The APN name decides the default GTP termination point (cloud or fast path) where the UE specific GTP encapsulation/decapsulation flows are initially created.
2. The fast path switch acts as a router on behalf of user plane VMs (GTP termination points) located in the cloud. For this purpose a flow entry, that forwards all GTP packets arriving from S1 interface destined to a user plane VM, is created to the fast path (indicated as arrow 225 in FIG. 2. Another flow entry is created for the mobile IP address pool associated to the cloud APN (indicated as arrow 226 in FIG. 2).
3. The dynamic switching of GTP termination point is initiated when OpenFlow controller receives a trigger (e.g. traffic volume threshold that is exceeded or manual).
4. When moving a session from cloud to fast path the UE specific GTP encapsulation/decapsulation flow entries are created to the fast path with higher priority than the flows explained in step 2 above.
5. When sessions are moved from fast path to the cloud the user plane VM with free capacity may be selected or possibly a new one is started, the UE specific GTP encapsulation/decapsulating flow entries are created to that VM and removed from the fast path. In the fast path the flow entries described in step 2 above are used when UE specific flows do not exist.
6. GTP packets that do not match in any UE specific GTP termination flows in the fast path are forwarded to the cloud. GTP packets, that do not have UE specific GTP termination flows in the cloud either, are dropped.

It should be noted, that the dynamic GTP termination point switching may be an internal functionality of gateway 200 and may not be visible to other network elements or network entities.

Figure 3:
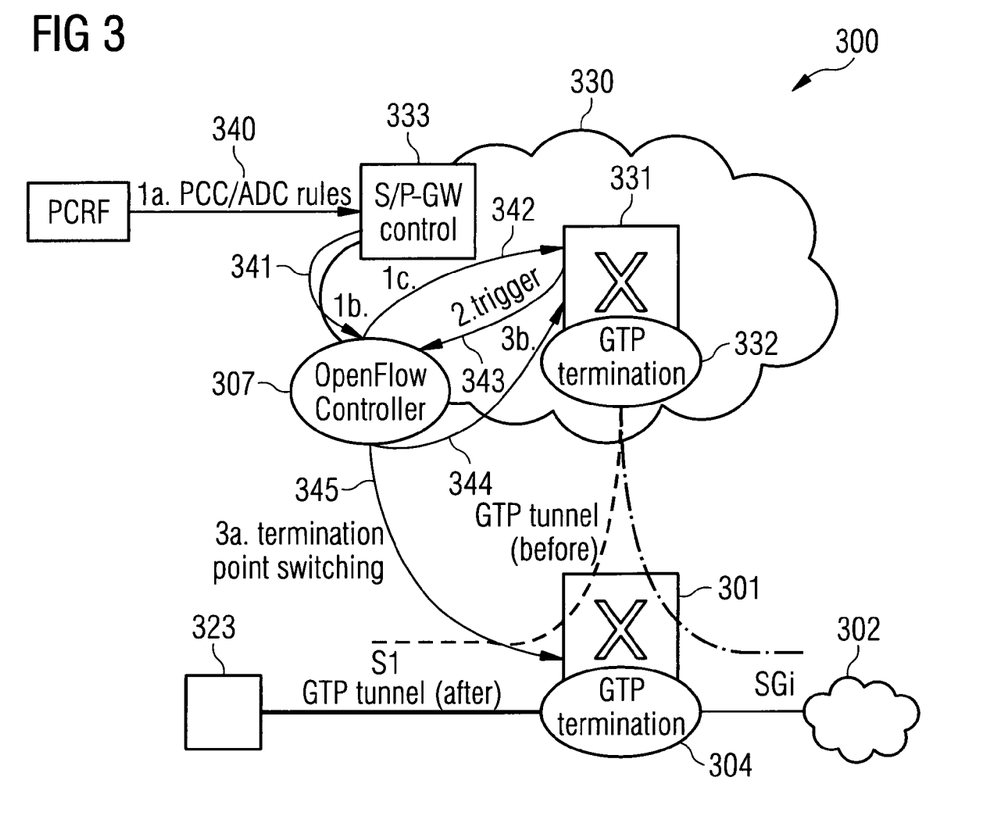
FIG. 3 schematically shows a dynamic GTP termination switching mechanism triggered by PCC/ADC rules.

In the following, in the context of FIGS. 3 and 4 an example of a potential trigger mechanism for GTP termination switching of change will be explained in more detail FIG. 3 schematically shows a dynamic GTP termination switching mechanism triggered by PCC/ADC rules. In particular, FIG. 3 shows a gateway 300 similar but simplified with respect to the one shown in FIG. 2. The gateway 300 comprises a fast path node or fast path element 301 connected to the Internet 302 via a user plane interface SGi and to an enhanced NodeB 323 via a user plane interface S1. In particular, a first or fast path switch is implemented in the fast path node 301 implementing some routing function. In addition the first switch may function as one possible GTP termination point 304 as indicated in FIG. 3. The fast path switch is connected to or forms an interface to a fast path connected to a cloud 330 via a further fast path switch 331, which may act as a dynamic GTP termination point 332 as well. All switches may be implemented as virtual or hardware switches.

One possibility to implement may be as following:

The S/P-GW controller 333 or control element may get the PCC/ADC rules including new information elements described later in table 1 in Diameter AVPs over a Gx interface from PCRF and indicated by arrow 340. JSONRPC messaging may be used in north bound interface to carry rule information between S/P-GW control element 333 and OpenFlow controller 307 (indicated by arrow 341). OpenFlow controller creates relevant flows to the switch 331 (indicated by arrow 342). Application detection rules may have a flow table of their own and it may contain UE specific rules for each application to be detected and a meter included in each flow. This meter may then send a notification to the controller when packets match to the flow which triggers the GTP termination point switching procedure in OpenFlow controller (indicated by arrow 343).

Following this trigger 343, the OpenFlow Controller 307 may decide whether a GTP termination point switching or change is appropriate or not (indicated by the arrows 344 and 345). Application detection is preferably implemented separately in uplink and downlink directions.

In other words the use case may be the following:

Virtualized SDN-based S/P-GW that implements PCEF enhanced with application detection and control (ADC) functionality may be connected to the PCRF via standard Gx interface (340). During an attach procedure PCRF may instruct the gateway which applications to detect by activating the appropriate subscriber specific ADC/PCC rules. PCC/ADC rules may first arrive to the S/P-GW control element which forwards relevant information to SDN controller via north bound API (341). The responsibility of the SDN controller may be to program relevant flow entries to the switch (342) which is the GTP termination point for this subscriber. In these rules a new information element "GTP Termination point switching" (table 1) is enabled and "Termination point switching Destination" contains the destination switch identifier. It is possible to use wildcard in this field which leaves the decision of actual destination switch to the controller with the restriction that currently cloud terminated GTP session will be moved to the fast path and vice versa. When the application start/stop is detected the controller may be notified (343) and GTP termination point switching procedure may take place (344, 345)

TABLE 1

New enforcement action.

| Information name | Description |
| --- | --- |
| Policy Control GTP Termination point switching | GTP Termination point switching state (enabled/disabled) |
| Termination point switching Destination | Switch Identifier to which the GTP termination point will be transferred |

Table 1 shows enforcement actions or defines new fields according to an exemplary embodiment.

Figure 4A:
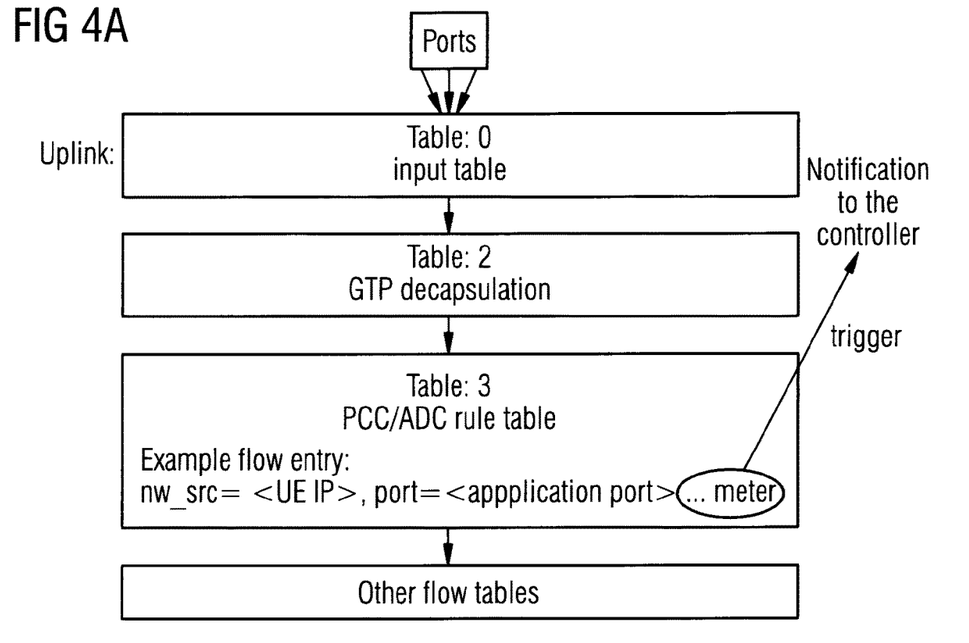
FIGS. 4A and 4B schematically show examples of ADC/PCC rule tables in OpenFlow switch.
Figure 4B:
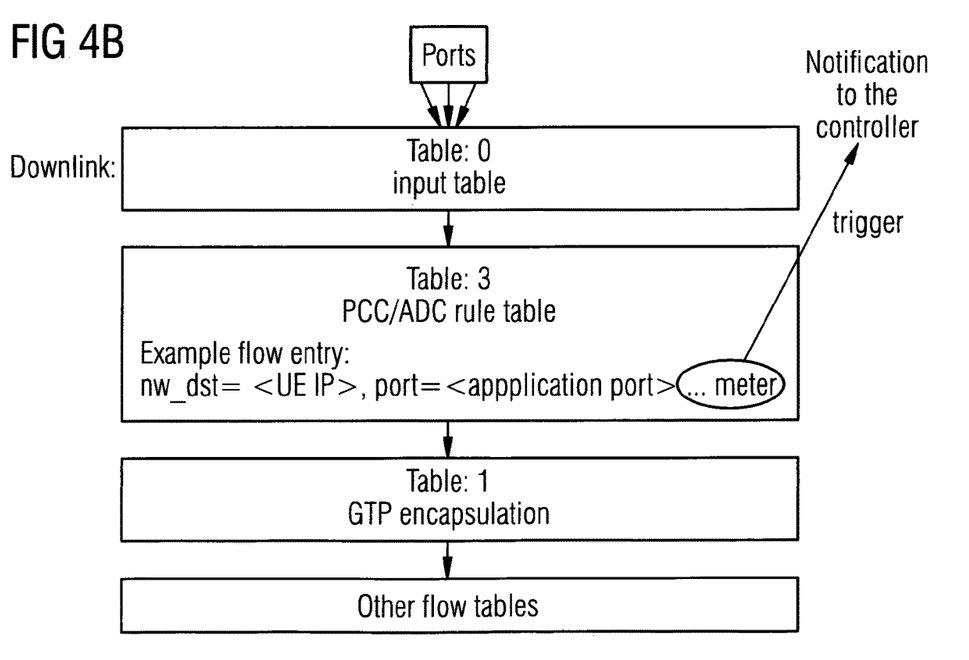

FIGS. 4A and 4B schematically show examples of ADC/PCC rule tables in OpenFlow switch. In particular, FIG. 4A describes a process flow including the use of ADC/PCC rule flow tables in uplink direction, while FIG. 4B describes the same for downlink direction.

In the claims, any reference signs placed in parentheses shall not be construed as limiting the claims. The word "comprising" and "comprises", and the like, does not exclude the presence of elements or steps other than those listed in any claim or the specification as a whole. The singular reference of an element does not exclude the plural reference of such elements and vice-versa. In a device claim enumerating several means, several of these means may be embodied by one and the same item of software or hardware. The mere fact that certain measures are recited in mutually different dependent claims does not indicate that a combination of these measures cannot be used to advantage.

LIST OF REFERENCE SIGNS

100 EPC packet gateway
101 fast path node
102 cloud
103 fast path
104 controller
105 GTP termination point
106 using of OpenFlow
200 gateway
201 fast path node
202 Internet
203 fast path switch
204 GTP termination point
205 first Br-tun switch
206 compute node
207 cloud controller node/management node
208 second Br-tun switch
209 third Br-tun switch
210 integration bridge
211-213 virtual machines
214 bridge
215, 216 DHCP servers
217 switch
218 Ethernet interface
219 external network
220 OpenFlow controller
221, 222 control path
223 first network
224 second network
225 creation of flow entry
226 creation of flow entry
227 GTP termination point
300 gateway
301 fast path node
302 Internet 203 fast path switch
304 GTP termination point
307 cloud controller node/management node
330 cloud
331 fast path switch
332 GTP termination point
333 S/P-GW control
340 forwarding PCC/ADC rules
341 carry rule information to OpenFlow Controller
342 creating relevant flows to switch
343 triggering/notification
344 GTP termination point switching
345 GTP termination point switching

LIST OF ABBREVIATIONS

ADC=Application Detection and Control
APN Access Point Name
EPC Evolved Packet Core
GTP GPRS Tunnelling Protocol
JSONRPC JavaScript Object Notation Remote Procedure Call
NFV Network Functions Virtualization
ONF Open Networking Foundation
PCC Policy and Charging Control
PCEF Policy and Charging Enhancement Function
PCRF Policy and Charging Rules Function
P-GW Packet data network Gateway
SDN Software Defined Networking
S-GW Serving Gateway
UE User Equipment
VM Virtual Machine

The invention claimed is:

1. A method of operating a network entity of a network comprising a gateway, the method comprising:
dynamically changing a packet processing resource, wherein
the packet processing resource comprises a General Packet Radio Services (GPRS) Tunneling Protocol (GTP) termination point in the gateway, wherein
the gateway comprises a cloud comprising a virtual switch connected to a fast path switch, wherein
the changing the General Packet Radio Services Tunneling Protocol termination point is initiated by a trigger, and the trigger is generated based on a detection of a transmitted packet matching a user equipment specific rule defined in policy and charging control rules or application detection and control rules.

2. The method according to claim 1, wherein the packet processing resources is at least one of packet processing resources selected out of the group consisting of GTP termination point and Internet Protocol Security (IPsec) termination point.

3. The method according to claim 1, wherein the gateway is a virtualized gateway.

4. The method according to claim 1,
wherein the gateway further comprises a fast path node including the fast path switch, and
wherein the user data packets arrive at the gateway via the fast path switch.

5. The method according to claim 1, wherein the virtual switch of the cloud and the fast path switch operate on the same communication protocol.

6. The method according to claim 4, wherein the fast path switch acts as a router or a forwarder.

7. The method according to claim 1, further comprising generating flow entries to a fast path connecting the cloud and the fast path node, wherein the generating is performed at a high priority.

8. The method according to claim 1, further comprising moving a session from one processing point to another one.

9. The method according to claim 1, further comprising selected packet flow forwarding to the cloud.

10. The method according to claim 1, further comprising exchanging a message including at least one field, wherein a value of the field is indicative of at least one value selected out of the group consisting of value indicative of an ability of a GTP termination point to be changed, and a value identifying the GTP termination point to be changed.

11. The method according to claim 10, wherein the at least one field is implemented in policy and charging control rules or application detection and control rules.

12. The method according to claim 11, further comprising receiving the policy and charging control rules or the application detection and control rules at a software defined networking controller.

13. The method according to claim 11, wherein the policy and charging control rules or application detection and control rules are transmitted to a gateway via policy and charging rules function.

14. A network entity comprising at least one controller and at least one processing unit
adapted to perform a method according to claim 1.

15. A network comprising the network entity according to claim 14 and a second network entity comprising at least one controller and at least one processing unit, wherein the network entity and second network entity are connected to each other by a communication link.

16. A non-transitory computer-readable medium, in which a computer program is stored, which, when being executed by a processor, is adapted to control or carry out a method according to claim 1.

* * * * *